May 7, 1957 R. S. McDONOUGH ET AL 2,791,082
POWER LAWN EDGER
Filed March 20, 1956
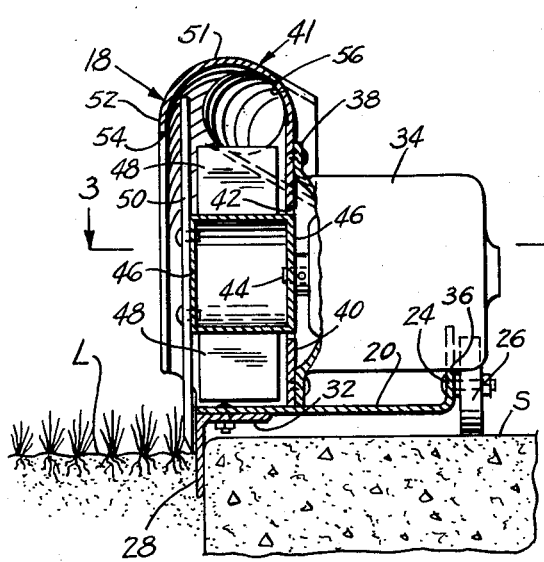
FIG. 2
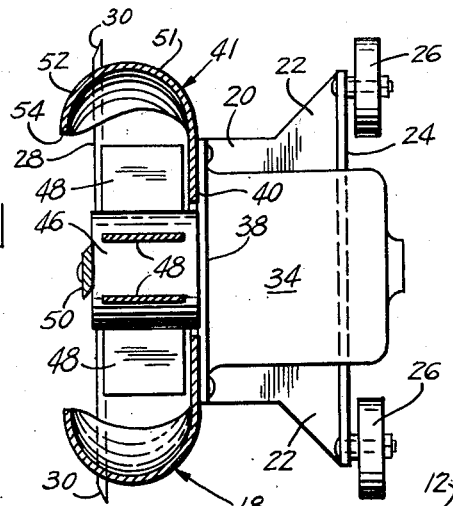
FIG. 3
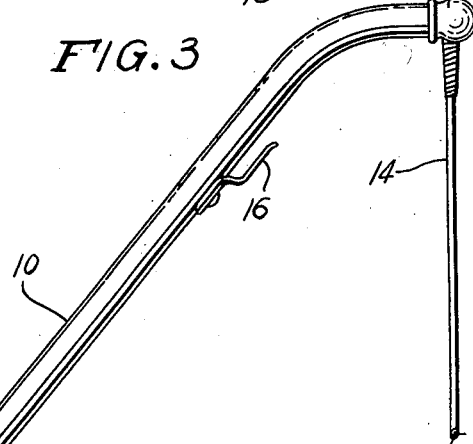
FIG. 1
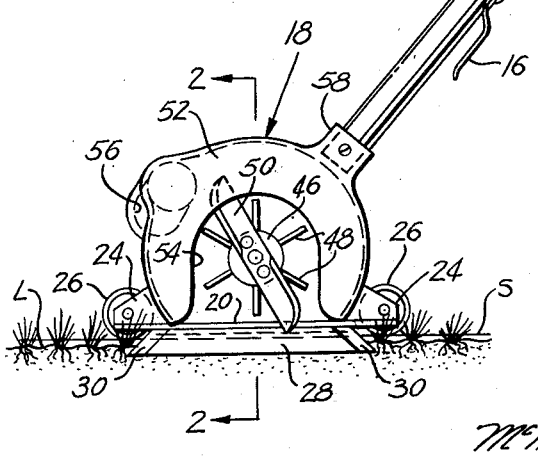
INVENTOR.
ROBERT S. McDONOUGH
ERNEST SVOBODA
BY
McMorrow, Berman + Davidson
ATTORNEYS United States Patent Office 2,791,082
Patented May 7, 1957

2,791,082

POWER LAWN EDGER

Robert S. McDonough and Ernest Svoboda, Wichita, Kans.

Application March 20, 1956, Serial No. 572,685

4 Claims. (Cl. 56—25.4)

This invention relates to lawn edging devices, and more particularly has reference to a power edger which may be summarized briefly as follows: a carriage is provided with wheels along one side thereof, and secured to the other side of the carriage is an elongated guide rail, having upwardly facing inclined surfaces at its opposite ends, which surfaces are adapted to raise roots, grass, etc., in position to permit cutting of the same by a blade rotating in a vertical plane in close proximity to the guide rail. The guide rail is adapted to extend in contact with a curb, sidewalk, or the like along one edge of which the trimming of the lawn is to be done, and the provision of beveled ends at opposite ends of the guide rail is adapted to permit operation of the edging device in either direction.

Extending upwardly from the carriage is a housing, for a series of fan blades secured to the cutting blade for rotation therewith, the cutting blade also extending within said housing so as to provide maximum protection against flying rocks, twigs, etc. The fan and cutting blades are adapted to be rotated by a motor mounted upon the housing, and extending from the housing in a direction away from the part of the grass being edged is a discharge conduit, adapted to direct the cuttings onto the sidewalk or street, thus keeping the lawn free of cuttings.

One important object of the present invention is to provide a lawn edger of the type referred to which can be readily operated either in a forward or rearward direction. In this way, should a particularly heavy patch of grass or roots be encountered, the edger can be moved backward and forward for the purpose of insuring a proper cutting action at this point along the walk or curb upon which the carriage is being moved.

Another object is to provide a device of the nature referred to which will have a particularly effective action as regards the trimming of the grass, providing a narrow, neat groove along the side of the curb to improve the appearance of the lawn being edged.

Another object is to provide a device of the nature described wherein the housing is so formed that the cutting blade will extend downwardly out of the lower end of the housing, with its upper end terminating adjacent an inclined wall portion of the housing. In this way, grass thrown upwardly by the cutting blade and traveling in the general plane of the cutting blade will be deflected by the obliquely inclined wall portion toward the area in which the fan blade is operating, so as to be directed, by air currents generated by the fan blade, through the exhaust passage or outlet conduit of the device.

Another object is to provide a lawn edging device so designed as to simplify measurably the manufacture thereof, thus to permit manufacture and sale of the device at a relatively low cost.

Still another object of importance is to provide a lawn edging device that will be relatively light and compact, so as to facilitate its operation and also its storage in a comparatively small area.

Still another object of importance is to provide a lawn edging device having a particularly effective guide rail device, for turning up roots and grass into positions in which the same will be acted upon by the cutting blade.

Other objects will appear from the following description, the claims appended thereto, and from the annexed drawings, in which like reference characters designate like parts throughout the several views, in which:

Figure 1 is a side elevational view of a lawn edging device formed in accordance with the present invention;

Figure 2 is an enlarged transverse sectional view therethrough substantially on line 2—2 of Figure 1; and Figure 3 is a horizontal section taken substantially on line 3—3 of Figure 2, on the same scale as Figure 2.

Referring to the drawings in detail, the reference numeral 10 designates an elongated handle, the upper end of which may be curved rearwardly and provided with a knob 12, into which extends a conductor 14 which, as will be understood, would be provided at its free end with a plug for engagement in a conventional receptacle. Provided upon the handle are longitudinally spaced, operatively extending hook elements 16 about which the cord 14 may be wound when not in use.

The lawn edger includes a head generally designated at 18, adapted to be guided, through the medium of the handle 10, along one edge of a sidewalk or curb S, which sidewalk extends along a lawn L that is to be edged along the sidewalk.

The device includes a carriage comprising a flat plate 20, one side of which is progressively increased in length as at 22, said side being provided with an upwardly projected longitudinal flange 24 on the opposite ends of which wheels 26 are rotatably mounted to support the device for rollable movement along the sidewalk S.

Secured fixedly to the opposite side edge portion of the plate 20 is a guide rail 28, the opposite ends of which are oppositely beveled as at 30 to provide upwardly facing surfaces adapted to bias grass, roots, etc., upwardly into position to be acted upon by a cutting blade. The guide rail 28 is disposed in a vertical plane, and is integral at its upper edge with an inwardly, horizontally projecting longitudinal flange 32 which is secured to the carriage plate 20. The guide rail and flange 32 can be formed from a conventional piece of angle iron material, cut to the illustrated shape.

Mounted upon the carriage, intermediate opposite ends thereof, is a horizontally disposed electric motor 34, the outer end of which is in an arcuate recess 36 of flange 24. At its inner end, the motor casing has an outwardly directed flange 38 bolted or otherwise fixedly secured to the inner side wall 40 of a combination fan and cutter blade housing.

The housing, which has been designated generally at 41, is formed with an opening 42, said opening being disposed substantially centrally in the inner side wall 40 of the housing. The shaft 44 of the motor extends into the opening, and is secured to a hollow, cylindrical hub 46, from which a plurality of fan blades 48 radiate.

Secured to the outer end wall of the hub, in close proximity to the outer side edges of the fan blades, is a cutter blade 50 rotating in a vertical plane. The cutter blade is so dimensioned that its extremities will traverse the outer face of the guide rail 28, at a location above the bottom edge of the guide rail as shown in Figures 1 and 2.

The housing has a curved, circumferentially extending flange portion 51, integral with the periphery of the inner side wall 40 and extending laterally, outwardly from the side wall 40 in the general direction of the plane of the cutting blade. The flange portion 51 is transversely curved as shown in Figure 2, and extends through the greatest part of a circle, terminating at the plane of the carriage plate 20.

The flange portion 51 merges into an outer side wall 52, which is disposed outwardly of the plane of the cutting blade, so that the tips of the cutting blade will be confined within the housing through the full cycle of the cutting blade, except for the portion of said cycle in which the blade is traversing the guide rail 28, that is, is actually cutting grass. The outer side wall 52 has a large recess 54, exposing the main portion of the cutting blade and the fan and providing an inlet for air.

Integrally formed upon the housing is an exhaust conduit 56 which opens at its inlet end through the flange 51, at the forward end of the head 18 as shown in Figure 1. The conduit or exhaust pipe 56 extends laterally in a direction away from the lawn L, so that any cuttings will be discharged away from the lawn onto the sidewalk or street, and will not be deposited upon the lawn.

The housing is also formed with an upwardly, rearwardly inclined socket 58 into which the handle 10 is inserted and secured.

In use of the device, as it moves along the sidewalk with the motor in operation, the cutting blade will rotate at high speed, as will the fan blades. The leading edge of the guide rail will cammingly bias upwardly roots or grass, so that they will be positioned for cutting by the blade 50. The blade 50, when it cuts the grass, will throw the cuttings upwardly in the general plane of blade 50, so that said cuttings will strike the transversely curved flange portion 51 and will be deflected laterally, to the right in Figure 2 into the general plane on which the fan blades are turning. As a result, the fan blades will cause the cuttings to be blown out through the conduit 56. Passage of the air out of the conduit 56, of course, will cause air to be continuously drawn in through the recess 54, and this will further insure that the cuttings will all be channeled to the exhaust conduit.

The particular formation of the housing, further, insures to the maximum extent against accidental injury to the user. Flying rocks or twigs will be directed into the housing, thus providing a desirable safety feature.

Still further, the particular formation of the guide rail permits the device to be moved either forwardly or rearwardly, cutting effectively in either direction. Then again, the particular formation of the housing is designed not only to provide desirable safety features, but also to insure to the maximum extent that the grass cuttings will be directed through the exhaust conduit so as to be discharged laterally, in a direction away from the lawn.

Still further, the traversing of the guide rail by the cutting blade, which rotates in a plane in close proximity to the outer surface of the guide rail, insures that the cutting blade and the guide rail, acting in cooperation with one another, will provide a neat groove along the edge of the walk, with the grass being effectively trimmed at this point.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A power lawn edger comprising a carriage adapted to be moved along a walk, said carriage including a horizontlly disposed plate, and ground wheels arranged along one side edge of said plate and rollably supporting said plate above a walk; a vertically disposed guide rail positioned along an opposite side edge of said plate and having the upper end dependingly secured to said plate and adapted to extend downwardly along and engage an edge of a walk on which the wheels of the carriage are rolling; a motor having a shaft projecting therefrom mounted upon said plate so that the shaft is parallel to said plate and inwardly of and adjacent said plate opposite side edge with the motor adjacent said plate one side edge; a fan carried by said shaft for rotation therewith; a cutting blade adjacent the fan and also carried by said shaft for rotation therewith; and a housing mounted on said plate adjacent said opposite side edge thereof and extending about the cutting blade and fan and having an exhaust passage through which cuttings are discharged.

2. A power lawn edger comprising a carriage adapted to be moved along a walk, said carriage including a horizontally disposed plate, and ground wheels arranged along one side edge of said plate and rollably supporting said plate above a walk; a vertically disposed guide rail positioned along an opposite side edge of said plate and having the upper end dependingly secured to said plate and adapted to extend downwardly along and engage an edge of a walk on which the wheels of the carriage are rolling; a motor having a shaft projecting therefrom mounted upon said plate so that the shaft is parallel to said plate and inwardly of and adjacent said plate opposite side edge with the motor adjacent said plate one side edge; a fan carried by said shaft for rotation therewith; a cutting blade adjacent the fan and also carried by said shaft for rotation therewith; and a housing mounted on said plate adjacent said opposite side edge thereof and extending about the cutting blade and fan and having an exhaust passage through which cuttings are discharged, said housing having an inner side wall secured to the casing of the motor, a transversely curved flange portion extending over the fan and cutting blade to provide a deflecting surface whereby grass cuttings thrown up by the blade will be deflected toward the fan, and an outer side wall spaced laterally, outwardly from the cutting blade and having an inlet opening for air.

3. A power lawn edger comprising a carriage, said carriage including a flat, horizontally disposed plate having an upwardly turned flange along one side edge thereof and ground wheels rotatably mounted upon said flange; a guide rail of angular cross section secured to the plate at the other side thereof, said guide rail extending downwardly from the plate so as to be guided along the edge of a walk on which the wheels are rolling; a motor overlying the plate of the carriage, said flange having a recess receiving one end of the motor; a housing mounted upon the other end of the carriage, said motor being secured to the housing and having a shaft extending into the housing; a hub secured to said shaft within the housing; fan blades secured to the hub to rotate within the housing responsive to operation of the motor; a cutting blade secured to the hub adjacent the fan blades and adapted to rotate in a plane adjacent the guide rail; and an exhaust conduit opening within the housing and projecting laterally in a direction toward the first named side of the carriage.

4. A power lawn edger comprising a carriage, said carriage including a flat, horizontally disposed plate having an upwardly turned flange along one side edge thereof and ground wheels rotatably mounted upon said flange; a guide rail of angular cross section secured to the plate at the other side thereof, said guide rail extending downwardly from the plate so as to be guided along the edge of a walk on which the wheels are rolling; a motor overlying the plate of the carriage, said flange having a recess receiving one end of the motor; a housing mounted upon the other end of the carriage, said motor being secured to the housing and having a shaft extending into the housing; a hub secured to said shaft within the housing; fan blades secured to the hub to rotate within the housing responsive to operation of the motor; a cutting blade secured to the hub adjacent the fan blades and adapted to rotate in a plane adjacent the guide rail; and an exhaust conduit opening within the housing and projecting laterally in a direction toward the first named side of the carriage, said housing including a vertical inner side wall to which the motor casing is connected, a transversely curved flange portion extending at opposite ends thereof into engagement with the carriage plate, said flange portion providing a deflecting surface in the plane of the cutting blade adapted to deflect toward the fan cuttings thrown upwardly by the cutting blade within the housing, and an outer side wall vertically disposed in a plane spaced laterally, outwardly from the plane of rotation of the cutting blade, said outer side wall of the housing having a large opening providing an inlet for air.

References Cited in the file of this patent

UNITED STATES PATENTS

| | | |
|---|---|---|
| 2,139,353 | Bruder | Dec. 6, 1938 |
| 2,410,196 | Benthall | Oct. 29, 1946 |
| 2,547,328 | Koch et al. | Apr. 3, 1951 |
| 2,612,741 | McKay | Oct. 7, 1952 |
| 2,636,333 | Michaels | Apr. 28, 1953 |
| 2,718,743 | Smith et al. | Sept. 27, 1955 |
| 2,737,105 | Wilson | Mar. 6, 1956 |